April 2, 1974  D. PAHL  3,801,487
DEVICE FOR ADJUSTING THE WORKING GAP BETWEEN THE WORK PIECE
AND TOOL ELECTRODES DURING AN ELECTROCHEMICAL
MACHINING OPERATION
Filed Sept. 2, 1971
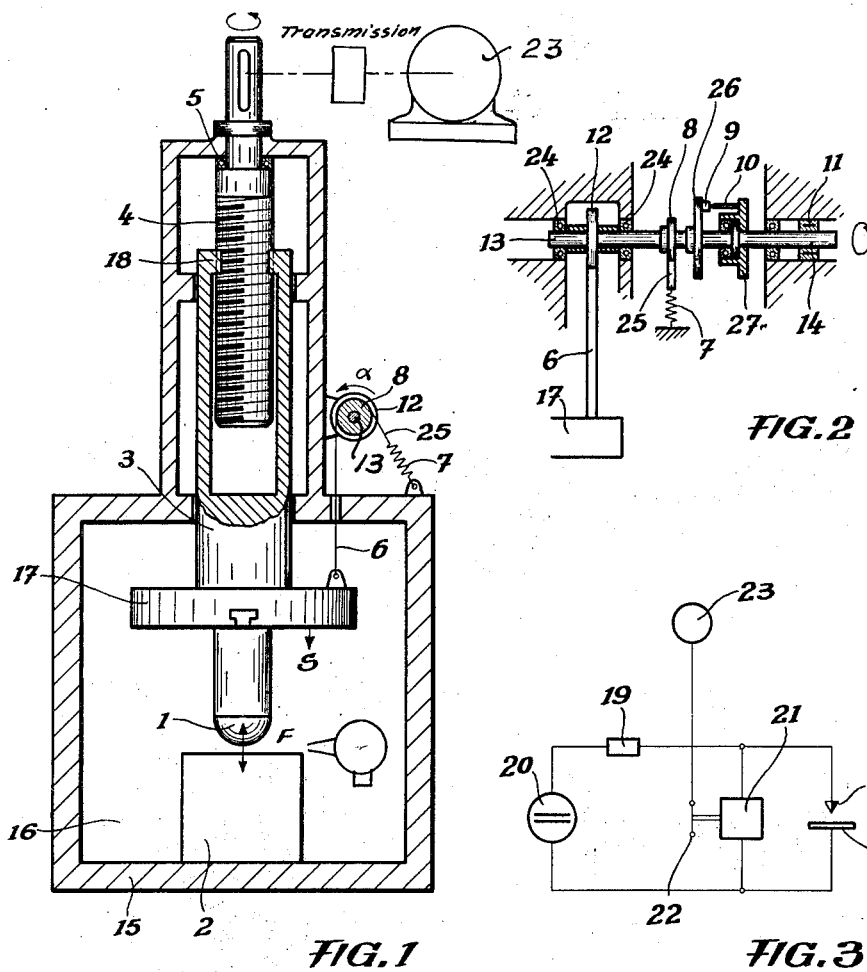
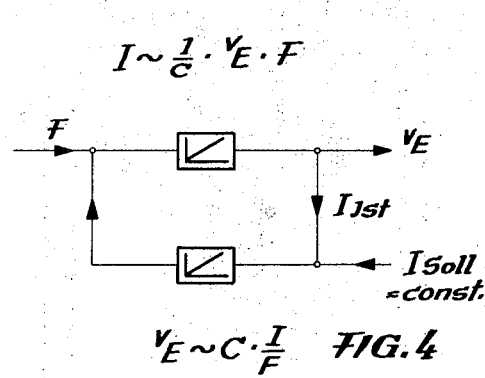
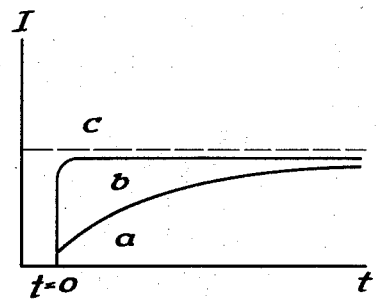
INVENTOR
Dietrich Pahl
By United States Patent Office 3,801,487
Patented Apr. 2, 1974

3,801,487
DEVICE FOR ADJUSTING THE WORKING GAP BETWEEN THE WORKPIECE AND TOOL ELECTRODES DURING AN ELECTROCHEMICAL MACHINING OPERATION
Dietrich Phal, Dietzenbach, Germany, assignor to NASSOVIA Werkzeugmaschinenfabrik G.m.b.H., Langen, Germany
Filed Sept. 2, 1971, Ser. No. 177,359
Claims priority, application Germany, Sept. 5, 1970, P 20 44 058.8
Int. Cl. B23p 1/14
U.S. Cl. 204—224 M
8 Claims

ABSTRACT OF THE DISCLOSURE

Method of and device for adjusting the working gap in an electrochemical machining system in which a tool electrode poled as cathode is by means of a feed motor moved relative toward a workpiece electrode poled as anode and in which after adjustment of a working gap between the electrodes an electrolyte is pumped through the working gap, while electrically parallel to the two electrodes there is provided a voltage detector which controls switch means for the feed motor in such a way that in the absence of a metallic contact between the two electrodes the tool electrode is moved by the feed motor toward the workpiece electrode whereas in response to a metallic contact between the electrodes the voltage detector opens the switch means, and the feed motor is stopped.

The present invention relates to electrochemical machining and, more specifically, concerns a method of and apparatus for controlling the working gap in devices for electrochemically machining, especially electrochemically sinking, according to which a tool electrode poled as cathode is by means of a feed motor moved toward a workpiece poled as anode whereupon, after adjustment of the working gap between the workpiece and the tool, an electrolyte is pumped through the working gap.

The electrochemical sinking process is a copying machining method according to which by a translatory feeding advancement, in most instances a feeding movement of the tool, a sinking-in in the workpiece is produced in one single working operation. With a predetermined sinking depth it is important to know at which position of the feeding spindle carrying the tool, the tool will be tangent to the plane determined by the upper edge of the workpiece, because it is from this point that the sinking depth through which the tool has to pass during the machining operation will be calculated.

Heretofore it was customary to set the working gap, as a rule, by hand. Such a procedure, however, is time consuming so that relatively long stopping times of the device are necessary. Moreover, the manual adjustment frequently results in a lack of precision.

It is, therefore, an object of the present invention to provide a method of and device for adjusting the working gap between workpiece and tool automatically in a minimum of time and in a reliable way.

This object and other objects and advantages of the invention will appear more clearly from the following specification in connection with the accompanying drawing, in which:

FIG. 1 diagrammatically represents a section of a device according to the invention for electrochemically sinking.

FIG. 2 is a diagrammatic illustration of a section showing means for compensating the springiness of the machine.

FIG. 3 is a diagrammatic circuit for use in connection with the device according to the invention.

FIG. 4 is a circuit diagram for an optimum exploitation of the installed direct current generator power.

FIG. 5 represents a diagram for illustrating differently controlled working cycles.

The device according to the present invention is characterized primarily in that parallel to the two electrodes formed by a tool and a workpiece respectively there is arranged a voltage generator adapted to control a switch-on and switch-off mechanism for the feed motor in such a way that when no metallic contact is being established between the two electrodes, the tool will be moved toward the workpiece whereas, when workpiece and tool engage each other, the voltage detector opens the switch and the feed motor is stopped.

As long as the tool does not engage the workpiece, the voltage drop is practically non-terminating or unlimited so that the switch located in the current supply to the feed motor is held closed by the voltage detector. When workpiece and tool engage each other, in other words when a metallic contact exists between workpiece and tool, the voltage drop between tool and workpiece is practically zero. As a result thereof, the voltage detector opens the switch so that the current supply to the feed motor is interrupted and therefore the feeding movement of the work tool is stopped. From this contact position the tool electrode is subsequently moved back by an amount equalling the working or equilibrium gap and in a direction opposite to the sinking direction before the electrolyte is pumped into the working gap between tool and workpiece. In view of the electrochemical reactions taking place in the working gap, the workpiece dissolves against the anode. The current intensities in this connection amount to from 0.5 to 5 a./mm.². These current intensities require an intensive movement of the electrolyte solution in the working gap because the electrolyte solution will heat up when the current is passing therethrough, which means that the electrolyte has to be fed through bores or slots in the tool at pressures of from 5 to 15 kp./cm.². The thus occurring hydrostatic forces F which are proportional to the electrode surface and the electrolyte pressure are by the machine elements located in the power flow and carrying or guiding the workpiece conveyed into the machine stand. Inasmuch as these machine elements cannot be designed infinitely rigid, the feeding device will be subjected to spring forces in conformity with the hydrostatic forces.

This brings about that the previously adjusted working gap will be increased so that, when the sinking depth is calculated from the previously adjusted relative position between workpiece and tool, a springiness will occur which acts against the sinking direction and brings about a reduction in the engraving depth in the workpiece. In order to avoid such copying errors caused by the springiness, the device according to the present invention for electrochemically sinking is characterized by a device for compensating for the springiness of the machine which latter has its origin in the hydrostatic forces generated by the electrolyte between the workpiece and the tool. In conformity with the present invention, to this end there is provided a conveying system which conveys the springiness movement caused by the electrolyte introduced into the working gap to a control element which is spatially adjustable in conformity with the springiness movement. This control element is adapted to cooperate with an automatically spatially adjustable switch for the feed motor.

Referring now to the drawing in detail, the device shown therein comprises an apparatus for electrochemically sinking which has a working or electrolyte chamber 16 surrounded by a housing 15. Fastened in the chamber 16 in a suitable manner is a workpiece 2. Opposite to the workpiece 2 there is provided a tool electrode 1 which is supported by a spindle 3 through the intervention of a holding plate or tool receiving means 17. The movement of the spindle 3 in axial direction is effected by means of a motor driven driving spindle 4 which is guided in a nut 18 to the spindle 3. The spindle 4 rests on housing 15 through the intervention of an axial bearing 5. A drive or feed motor 23 is provided for the drive of the spindle 4, said drive or feed motor being adapted through a transmission, coupling or the like to act upon the spindle 4.

For purposes of electrochemically sinking, the tool 1 is sunk into the workpiece 2. An electrolyte solution is pumped at high pressure in the working or equilibrium gap between tool and workpiece 2. The hydrostatic forces F generated in this way, which forces are proportional to the electrolyte surface and the electrolyte pressure, are by the machine elements located in the power flow, spindle 3, spindle 4 and axial bearing 5, transmitted into the machine stand or the machine housing 15. Inasmuch as these machine elements cannot be infinitely rigid, it will be appreciated that during the pumping of the electrolyte into the working gap, a springiness or elastic push back of the feeding unit will occur in view of the hydrostatic forces F and, more specifically, relative to the condition at which no electrolyte is present between workpiece and tool.

According to FIG. 3, the tool 1 and the workpiece 2 are connected through a preceding resistor 19 to a direct current source 20. The voltage of the direct current source 20 amounts, for instance, to 5 volts, whereas the current may have, for instance, an intensity of 1 ampere.

For purposes of setting the machine, the tool 1 is by means of a feed motor moved by the driving spindle 4 and by the spindle 3 toward the workpiece 2. As long as tool 1 does not contact the workpiece, the voltage drop is practically infinite which fact is indicated by the voltage detector 21 which in the current circuit is arranged parallel to the two electrodes 1 and 2. In this instance a switch 22 controlled by the voltage detector 21 is closed. Switch 22 is located in the current supply to the diagrammatically illustrated feed motor 23. When tool and workpiece 2 engage each other, in other words when a metallic contact is established, the voltage drop becomes zero. As a result thereof, switch 22 is opened via the voltage detector 21, and the current supply to the feed motor is interrupted whereby the feeding movement of the tool is stopped.

After the metallic contact between tool and workpiece has been established, the tool electrode 1 is moved back by the amount of the working or equilibrium gap against the sinking-in direction. Starting from this retracted position, there is now obtained a precise reference factor for the sinking depth of the tool in the workpiece in conformity with a predetermined engraving depth.

In view of the above mentioned elastic push back of the feeding unit caused by the electrolyte introduced into the working gap for machining purposes, the working gap set by means of the arrangement described in connection with FIG. 3 is again increased so that the elastic push back effected in a direction counter to the sinking direction would lead to a decrease in the engraving depth in the workpiece and thereby to copying irregularities. In order to avoid such copying errors, it is suggested according to the invention to equip the electrochemical sinking device with a device for compensating for the push back effect.

To this end, the tool electrode 1 or the tool electrode receiving means 17 has a steel band 6 connected to one end while the other end of the steel band 6 is connected to a pulley or reel 12 upon which the steel band 6 may be wound. Pulley 12 is keyed onto a shaft 13 which rotates in antifriction bearings 24. Shaft 13 carries a further pulley or reel 8. A steel band 25 winding off the reel 8 will, in view of the tension spring 7, convey a return force to shaft 13 and thereby to the steel band 6. Further- more, keyed to shaft 13 is a control element disc 26 which carries a control cam 9. Coaxially with shaft 13 there is provided an additional shaft 14 which carries a control disc 27 provided with a switch 10. The arrangement is such that the control cam 9 and the switch 10 are movable relative to each other while the control cam 9 when contacting the switch 10 brings about a control function.

If a tool electrode 1 is associated with the workpiece 2 in such a way that therebetween a metallic contact exists, it will be appreciated that the electrode would be moved back in a direction opposite to the sinking direction by a distance equalling the working or equilibrium gap. In this position, the shaft 14 will be rotated until the control cam 9 actuates the switch 10. In this position, shaft 14 is braked by a brake 11. Following the turning on of the electrolyte current, the feeding unit will spring back, i.e., will be pushed back.

As a result thereof, shaft 13 will through steel band 16 be rotated in such a way that the control cam 9 will again free the contact. Prior to switching-on the direct current source which furnishes the working current, the feed motor 23 is through a suitable control again driven in feeding or sinking direction, and the spindle 3 and thereby the tool electrode 1 and the electrode receiving means 17 are rotated forwardly in the direction toward the workpiece. At the same time a stroke-dependent rotation of shaft 13 occurs until the push back movement is again compensated for and cam 9 actuates the switch 10. In this position, the tool electrode is spaced from the workpiece by a distance which corresponds to the previously adjusted equilibrium gap. By means of a suitable control, the direct current source is turned on, and the feeding movement of the tool electrode 1 required for the working process is introduced at the preselected sinking speed.

During the electrochemical sinking of three-dimensional forms, at the start of the working process generally only a small surface of the tool electrode is effective for an anodic removal on the workpiece. Inasmuch as generally the working voltage, the sinking speed, and the conductability of the electrolyte solution are maintained constant during a sinking process, it will be appreciated that with a small tool electrode surface effective for an anodic removal a relatively low working current I results which is proportional to the effective electrode surface F and to the sinking speed $v_E$.

With increasing sinking depth, the effective, i.e., the engaged electrode surface, increases and toward the end of the sinking process the working current reaches the maximum current intensity corresponding to the machining conditions. Such working cycle is shown in FIG. 5 by the curve $a$. In this connection it is disadvantageous that the installed direct current generator output (curve $c$) can only be fully exploited during the last phase of the sinking process. In order to overcome this drawback, it is suggested in conformity with FIG. 4 to provide a control circuit by means of which the feeding speed $v_E$ can be controlled in such a way that the actual value of the working current is compared with a predetermined rated value and correspondingly at the beginning of the sinking process the operation takes place at a higher feeding speed which latter may then continuously be slowed down with increasing sinking depth in conformity with the engaged surface F. For such working cycle, the magnitude of the working current I is plotted over the time in FIG. 5 and this relationship is illustrated by the curve $b$. It will be appreciated that in this way over the entire period of the sinking process the current intensity I is nearly held constant so that it will equal or approximately equal the maximum installed generator power (curve $c$). It will also be appreciated that in this way the generator will during the sinking operation be exploited to a much better degree than heretofore while simultaneously the time for the completion of a sinking operation is considerably reduced.

It is, of course, to be understood that the present invention is, by no means, limited to the specific showing

What I claim is:

1. An arrangement in combination with an electrochemical machining system comprising: a tool electrode poled as cathode, a workpiece electrode poled as anode, electric feed motor means operatively connected to one of said electrodes for moving and retracting said one electrode relative to the other electrode to adjust a working gap between said electrodes, housing means surrounding said electrodes, pump means associated with said housing means and operable to pump an electrolyte through said working gap, voltage detector means electrically connected in parallel with regard to said electrodes, switch means operatively connected to said voltage detector means and said feed motor means and adapted to be controlled by said voltage detector means so as to open the energizing circuit for said electric feed motor means in response to a metallic contact between said electrodes to thereby cause said feed motor means to stop its electrode feeding action and so as to close the energizing circuit for said feed motor means in response to the lack of metallic contact between said electrodes to thereby cause said feed motor means to feed said one electrode relative toward the other electrode.

2. An arrangement in combination according to claim 1, which includes a direct current source, resistor means, and electric conductor means electrically connecting said electrodes through said resistor means to said direct current source.

3. An arrangement in combination according to claim 2, which includes compensating means for compensating elastic push back of said electrodes relative to each other by hydrostatic forces exerted by the electrolyte pumped through the working gap between said electrodes.

4. An arrangement in combination according to claim 3, which includes: control means, transfer means operatively connecting said one electrode to said control means for conveying said elastic push back to said control means, and additional switch means operatively connected to said control means and said feed motor means for controlling the latter in conformity with the push back conveyed to said control means.

5. An arrangement in combination according to claim 4, in which said control means and said additional switch means are adjustable.

6. An arrangement in combination according to claim 4, which includes control disc means rotatable in conformity with said elastic push back and supporting said control means, and additional disc means arranged opposite said control disc means and supporting said switch means.

7. An arrangement in combination according to claim 6, which includes rotatable shaft means having said control disc means keyed thereto, pulling means operatively connected to said one electrode and to said rotatable shaft means for rotating said control disc means in conformity with the respective push back, and return spring means continuously urging said rotatable shaft means to return to its position prior to said push back in a direction counter to the direction of rotation brought about by said pulling means in conformity with said push back.

8. An arrangement in combination according to claim 6, which includes brake means associated with said additional disc means for braking the same.

References Cited

UNITED STATES PATENTS

| | | | |
|---|---|---|---|
| 3,496,088 | 2/1970 | Pfau et al. | 204—224 M |
| 3,616,343 | 10/1971 | Inoue | 204—224 M |
| 3,650,923 | 3/1972 | Berghausen et al. | 204—224 M |

OTHER REFERENCES

Electrochemical Machining by DeBarr et al., p. 43, pub. by American Elsevier, New York, June 1968.

FREDERICK C. EDMONDSON, Primary Examiner

U.S. Cl. X.R.

204—129.5

UNITED STATES PATENT OFFICE
CERTIFICATE OF CORRECTION

Patent No. 3,801,487   Dated September 2, 1971

Inventor(s)   Dietrich Pahl

It is certified that error appears in the above-identified patent and that said Letters Patent are hereby corrected as shown below:

The inventor's name should read -- Dietrich Pahl --.

Signed and sealed this 26th day of November 1974.

(SEAL)
Attest:

McCOY M. GIBSON JR.
Attesting Officer

C. MARSHALL DANN
Commissioner of Patents